(12) United States Patent
Raiche

(10) Patent No.: US 8,997,307 B2
(45) Date of Patent: Apr. 7, 2015

(54) APPARATUS FOR COLLECTING MATERIAL FROM A SURFACE

(75) Inventor: Wayne Raiche, Matsqui (CA)

(73) Assignee: Loewen Welding & Manufacturing Ltd. (CA)

(*) Notice: Subject to any disclaimer, the term of this patent is extended or adjusted under 35 U.S.C. 154(b) by 397 days.

(21) Appl. No.: 13/335,321

(22) Filed: Dec. 22, 2011

(65) Prior Publication Data

US 2012/0159735 A1 Jun. 28, 2012

Related U.S. Application Data

(60) Provisional application No. 61/426,351, filed on Dec. 22, 2010.

(51) Int. Cl.
*A47L 5/14* (2006.01)
*A47L 9/00* (2006.01)
*A01K 1/01* (2006.01)
*A01D 51/00* (2006.01)

(52) U.S. Cl.
CPC ............... *A01K 1/01* (2013.01); *A01D 51/007* (2013.01); *A01K 1/0103* (2013.01)

(58) Field of Classification Search
USPC ............. 15/300.1, 302, 340.3, 320, 345, 347, 15/419, 421
IPC ................................ A47L 5/00,5/14, 7/02, 9/00
See application file for complete search history.

(56) References Cited

U.S. PATENT DOCUMENTS

| | | | |
|---|---|---|---|
| 3,585,670 A | 6/1971 | MacKinnon | |
| 4,037,390 A | 7/1977 | Vogelenzang | |
| 4,136,964 A | 1/1979 | Swisher, Jr. | |
| 4,184,581 A | 1/1980 | Crawshay et al. | |
| 4,200,950 A * | 5/1980 | Coverley | 15/314 |
| 4,218,226 A | 8/1980 | Boozer | |
| 4,534,461 A | 8/1985 | Silverthorn et al. | |
| 4,578,840 A * | 4/1986 | Pausch | 15/352 |
| 4,845,801 A * | 7/1989 | Milly et al. | 15/321 |
| 4,935,984 A * | 6/1990 | Bryant et al. | 15/302 |
| 5,010,620 A | 4/1991 | Young | |
| 5,155,876 A * | 10/1992 | Whitaker | 15/320 |
| 5,226,757 A * | 7/1993 | Tarrant | 406/39 |
| 5,590,754 A | 1/1997 | Lowery | |

(Continued)

OTHER PUBLICATIONS

Official Action for U.S. Appl. No. 13/469,482 mailed Jul. 19, 2013, 14 pages.

(Continued)

*Primary Examiner* — Dung Van Nguyen
(74) *Attorney, Agent, or Firm* — Sheridan Ross P.C.

(57) ABSTRACT

The present invention provides an apparatus for collecting material from a surface. The apparatus comprises a chassis, a holding tank, a material collector and a pumping system. The chassis comprises wheels for relocating the apparatus on the surface. The holding tank is for receiving the material and is operatively coupled with the chassis. The holding tank has a material-entry aperture in a bottom surface. The material collector comprises a suction device, which is operatively coupled with the material-entry aperture. The suction device has an inlet that can be disposed adjacent the surface. The pumping system is operatively connected with the holding tank for depressurizing the holding tank and thereby gathering the material at least partially via suction through the inlet of the suction device and the material-entry aperture in the holding tank.

10 Claims, 6 Drawing Sheets

(56) References Cited

U.S. PATENT DOCUMENTS

| | | |
|---|---|---|
| 7,797,789 B2 | 9/2010 | Nuhn |
| 7,963,387 B2 | 6/2011 | Carmody et al. |
| 8,191,202 B2 | 6/2012 | Nuhn |
| 8,336,163 B2 | 12/2012 | Nuhn |
| 8,365,346 B2 * | 2/2013 | Coppola et al. ............... 15/320 |
| 2006/0236498 A1 | 10/2006 | Nuhn |
| 2013/0192957 A1 | 8/2013 | Raiche |

OTHER PUBLICATIONS

Official Action for U.S. Appl. No. 13/469,482 mailed Dec. 17, 2013, 23 pages.

* cited by examiner

APPARATUS FOR COLLECTING MATERIAL FROM A SURFACE

CROSS-REFERENCE TO RELATED APPLICATIONS

This application claims the benefit and priority of U.S. Provisional Application 61/426,351, filed Dec. 22, 2010. The foregoing application is incorporated by reference herein in its entirety.

TECHNICAL FIELD

The present technology pertains in general to an apparatus for collecting materials. Specifically, the apparatus can be used for collecting various types of generally fluid material via suction.

BACKGROUND

Animal husbandry facilities, such as dairy or hog barns, include alleys or gutters for manure collection. Vehicles such as tractors or skid-steer loaders are equipped with scraper blades or front-end bucket systems to transfer manure accumulated in the alley or gutter to one end of the barn for removal and disposal. The manure is typically liquid or semi-liquid and is often difficult to transfer in this manner, as it escapes around the sides of the scraper blade or bucket. In addition, with the very large facilities that are becoming quite common in modern dairy farming, sometimes with an overall length in excess of 1000 feet, the quantity of accumulated material is too great to transfer to one end of the facility. As a result, there is a need for improvements in the collection and removal of manure from animal husbandry facilities.

Pneumatic collection of agricultural debris is used in a variety of operations both on and off the farm. For example, in the clean-up of spills of dry solid materials, such as grain or agricultural chemicals like fertilizer, vacuum cleaners are employed to pneumatically transfer spilled material to a storage container. An example of such a vacuum apparatus is provided in U.S. Pat. No. 4,218,226. However, these types of machines are not particularly well-suited to the collection of liquid or semi-liquid materials such as manure. Moreover, they lack any type of collection means for mounting beneath the apparatus to direct the collected material to the suction inlet when the apparatus is driven over the material, making them difficult to use in large scale mobile cleanup operations. Vacuum systems have been used for mobile cleanup of relatively dry manure, such as chicken and horse manure. U.S. Pat. No. 5,010,620 discloses a stall and pasture vacuum machine that includes a front mounted sled comprising a rotary brush. A mist of water may be provided to soften the manure and make it more amenable to pneumatic conveying. The collected manure is stored in a dump box with a hinged rear door. This machine is typically not suitable for the cleanup of liquid or semi-liquid materials.

Vacuum systems have been used in the clean-up of manure. U.S. Pat. No. 3,585,670 discloses an apparatus comprising a vacuum tank and a rear-mounted V-shaped scraper blade. However, in mounting the scraper blade at the rear of the apparatus, the manure is compacted prior to being collected, making it difficult to separate from the barn floor and difficult to convey pneumatically.

United States Patent Application Publication No. 2006/0236498 discloses another apparatus including a vacuum tank and a suction device for clean-up of manure. The apparatus is configured so that the suction device is connected to the vacuum tank via a suction conduit. Because the suction conduit opens directly into the lower half of the vacuum tank, the apparatus loses suction power during filling.

Therefore there is a need for a solution that overcomes at least one of the deficiencies in the art.

This background information is provided to reveal information believed by the applicant to be of possible relevance to the present invention. No admission is necessarily intended, nor should be construed, that any of the preceding information constitutes prior art against the present invention.

SUMMARY

An object of the present technology is to provide an apparatus for collecting material from a surface. In accordance with one aspect of the present technology, there is provided an apparatus for collecting material from a surface, the apparatus comprising: a chassis comprising wheels for relocating the apparatus on the surface; a holding tank for receiving the material, the holding tank operatively coupled with the chassis, the holding tank having a material-entry aperture in a bottom surface of the holding tank; a material collector comprising a suction device, the suction device operatively coupled with the material-entry aperture, the suction device having an inlet for disposition adjacent the surface; a pumping system operatively connected with the holding tank for depressurising the holding tank and thereby gathering the material at least partially via suction through the inlet of the suction device and the material-entry aperture in the holding tank.

In accordance with another aspect of the present technology there is provided an apparatus for collecting material from a surface, the apparatus comprising: a chassis comprising wheels for relocating the apparatus on the surface; a holding tank for receiving the material, the holding tank operatively coupled with the chassis, the holding tank having a material-entry aperture in the holding tank; a material collector comprising a suction device, the suction device operatively coupled with the material-entry aperture, the suction device having an inlet for disposition adjacent the surface, the material collector further comprises a suction device shut-off valve, the suction device shut-off valve configured to assume a closed configuration and one or more open positions, wherein in the closed position the suction device shut-off valve is configured to substantially suppress back-flow of material from the inlet of the suction device; and a pumping system operatively connected with the holding tank for depressurising the holding tank and thereby gathering the material at least partially via suction through the inlet of the suction device and the material-entry aperture in the holding tank.

DETAILED DESCRIPTION OF THE TECHNOLOGY

Definitions

Figure 1A:
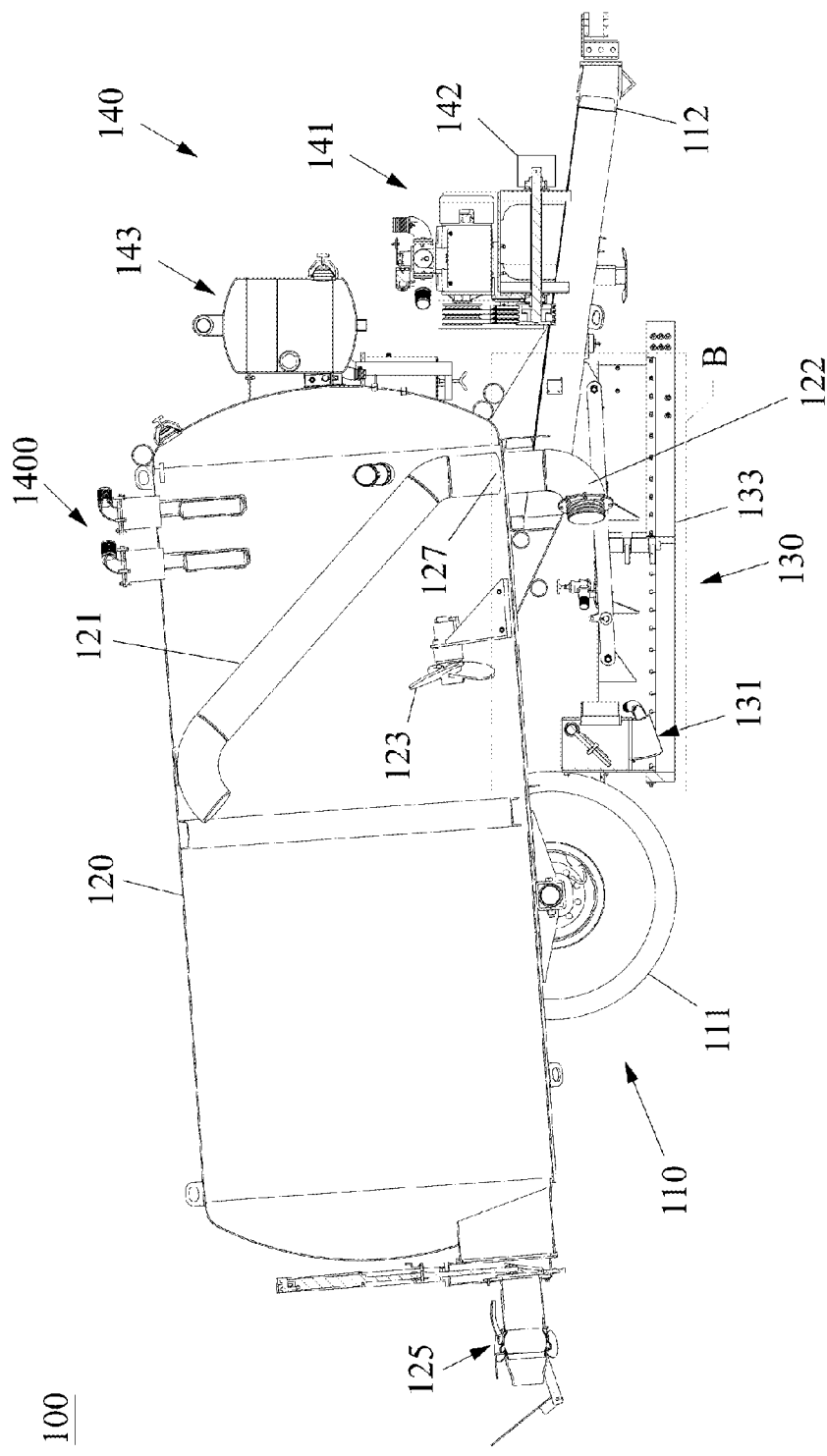
FIG. 1A illustrates a side-sectional view of an example apparatus according embodiments of the present technology.

As used herein, the term "about" refers to a +/−10% variation from the nominal value. It is to be understood that such a variation is always included in a given value provided herein, whether or not it is specifically referred to.

As used herein, the term "fluid" with reference to terms such as "material" or "substance" is used to refer to free flowing, pourable, liquid, semi-liquid solid and/or liquid, or similarly classifiable materials and/or substances.

As used herein and as the case may be, the terms "material" and/or "substance" may be used to refer to a fluid material/substance and may include various forms and/or modifications of animal waste, manure, sludge, sand, wood chips, pellets, compost, foliage or other organic or inorganic matter that can include varying aqueous or non-aqueous liquid content, for example.

As used herein, the term "surface" with reference to collection of material may be used to refer to a floor or bottom of a barn, hutch, pen, stable or other building for housing livestock, grain, fertilizer, salt, sand or other material storage buildings, for example.

Unless defined otherwise, all technical and scientific terms used herein have the same meaning as commonly understood by one of ordinary skill in the art to which this technology belongs.

The instant technology relates to an apparatus that can be used for collecting material that can be gathered at least partially via suction from a surface. The apparatus comprises a chassis, a holding tank, a material collector and a pumping system. The chassis comprises wheels for relocating the apparatus on the surface.

The holding tank is provided for receiving the material and is operatively coupled with the chassis. The holding tank has a material-entry aperture in a bottom surface. According to some embodiments, the material-entry aperture is coupled with an articulated-conduit coupling. According to some embodiments, the apparatus includes a riser conduit disposed within the holding tank. The riser conduit is operatively connected to the material-entry aperture to guide material through the material-entry aperture proximate a bottom surface of the holding tank through the riser conduit up towards a location proximate a top of the holding tank, as further described herein. The riser conduit can aid in limiting spillage of material from the apparatus through the suction device to a predetermined amount.

The material collector comprises a suction device which is, depending on the embodiment, directly or indirectly operatively coupled with the material-entry aperture of the holding tank. The suction device has an inlet that can be disposed adjacent the surface from which material can be collected, as further described herein. According to some embodiments, the suction device includes a suction device shut-off valve to suppress back-flow of material from the apparatus. The suction device shut-off valve can aid in limiting spillage of material from the apparatus through the suction device to a predetermined amount. According to some embodiments, the suction device shut-off valve is positioned substantially adjacent the inlet of the suction device, thereby limiting the back-flow of the material from within the apparatus, for example, from between the suction device and the material-entry aperture of the holding tank. According to some embodiments of the present technology, providing an apparatus with an adequately disposed suction device shut-off valve can help limit spillage of material from the apparatus during transport, for example within a barn and/or from a barn to a field.

The pumping system is operatively connected with the holding tank. The pumping system can be operated to depressurize or pressurize the holding tank relative to the ambient atmosphere of the apparatus. When depressurizing the holding tank, the pumping system enables gathering material from a surface underneath the apparatus at least partially via suction through the inlet of the suction device and the material-entry aperture in the holding tank. When pressurizing the holding tank, the pumping system enables discharging of material from the holding tank through a material-exit aperture in the holding tank. According to some embodiments, the apparatus is configured to allow discharge of material via free-flow of collected material from the holding tank and/or adequate venting of the holding tank.

Figure 1B:
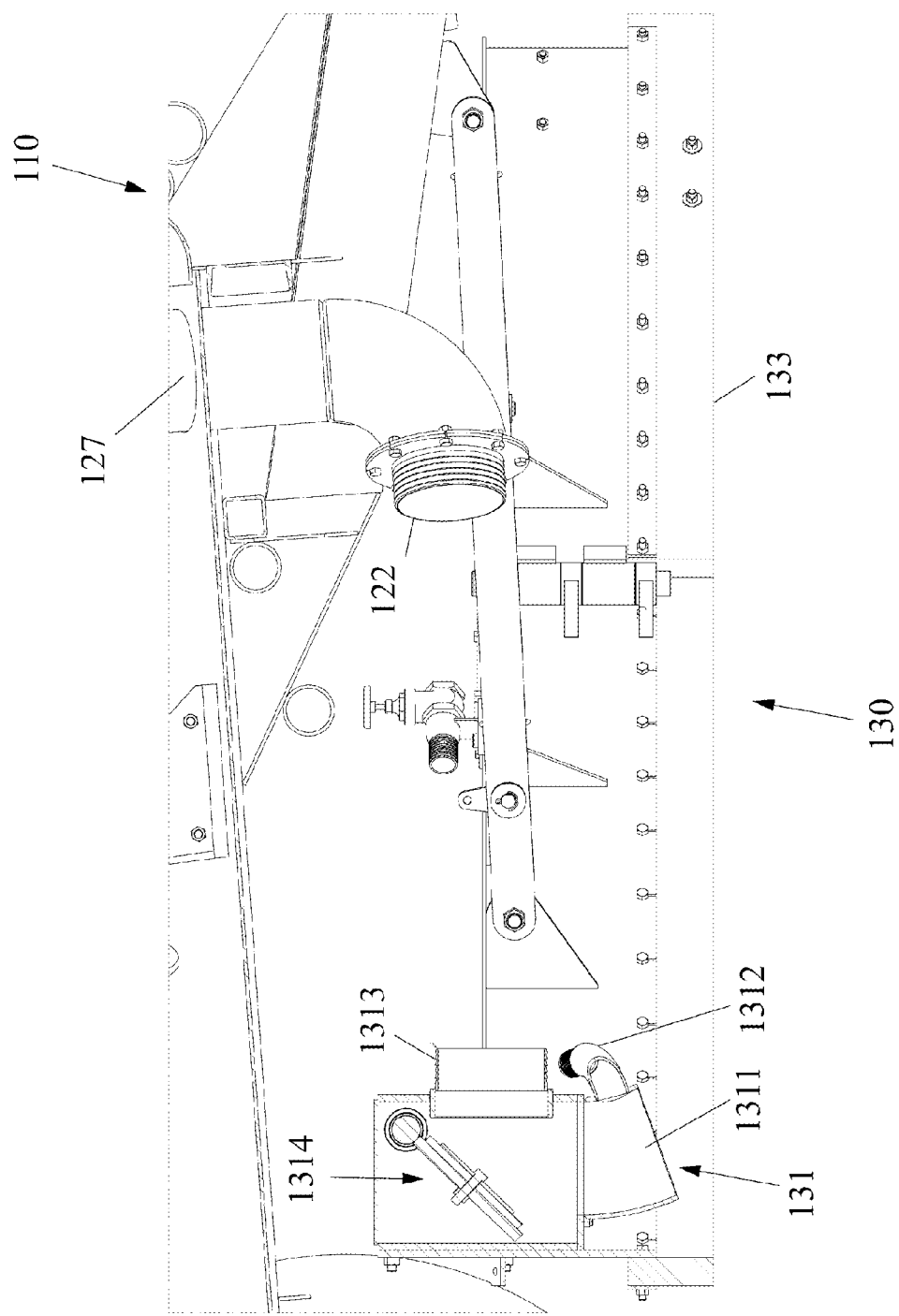
FIG. 1B illustrates a side view of a detail of the example apparatus illustrated in FIG. 1A.
Figure 1C:
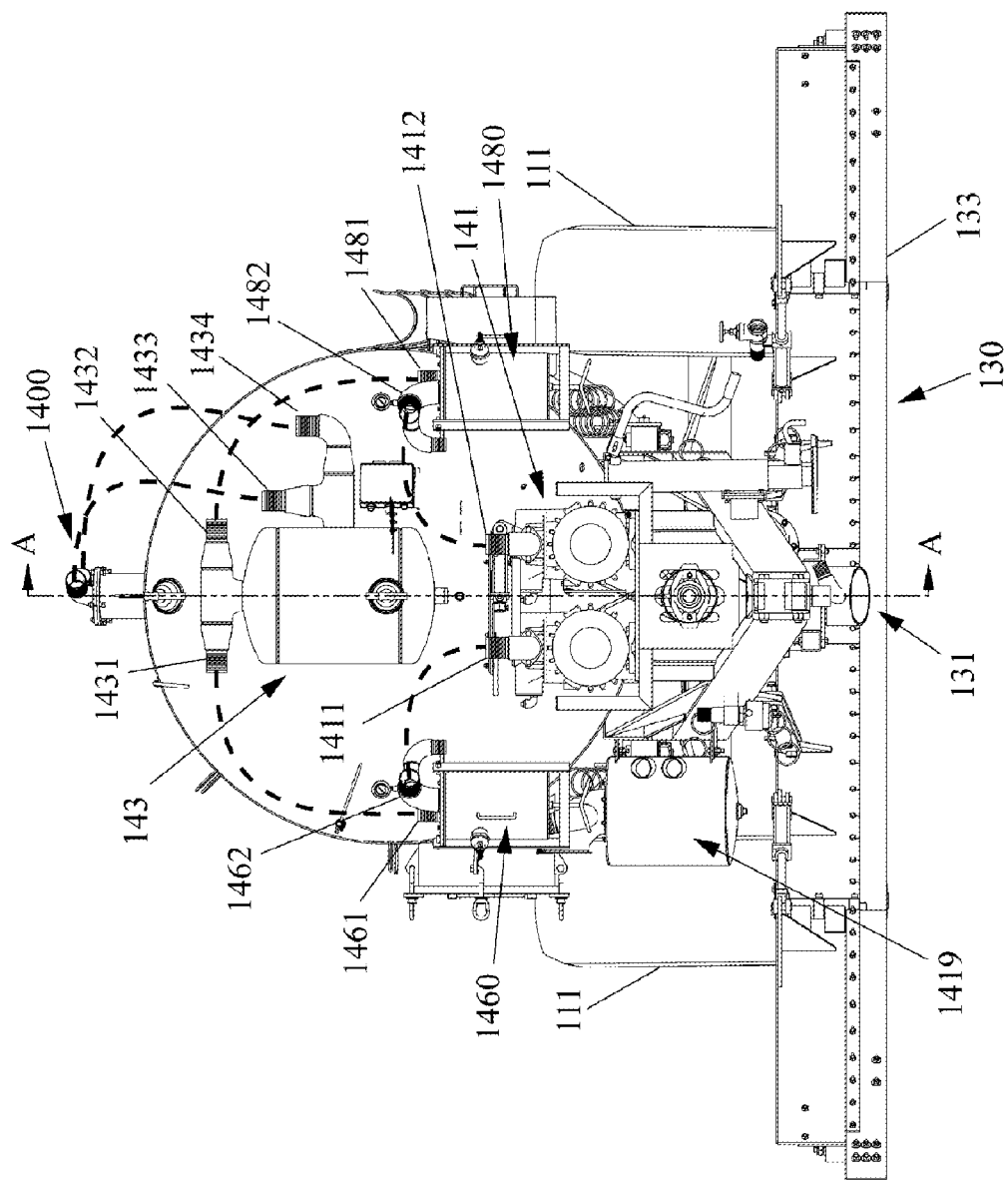
FIG. 1C illustrates a front view of the example apparatus illustrated in FIG. 1A.

FIG. 1A to 1C illustrate an example of an apparatus 100 according to a specific embodiment of the present technology. FIG. 1A illustrates a side-sectional view of the apparatus 100. The specific section illustrated in FIG. 1A is indicated by letters "A" in FIG. 1C. FIG. 1B illustrates a side view of a detail of the apparatus 100 as indicated by letter "B" in FIG. 1A. FIG. 1C illustrates a front view of the apparatus 100. The apparatus 100 is configured as a trailer for agricultural use. The apparatus comprises a chassis 110, a holding tank 120, a material collector 130, and a pumping system 140. The apparatus 100 further comprises a suction device 131, a material-moving system 133, a riser conduit 121, and a mixing device 123, for example.

Figure 2A:
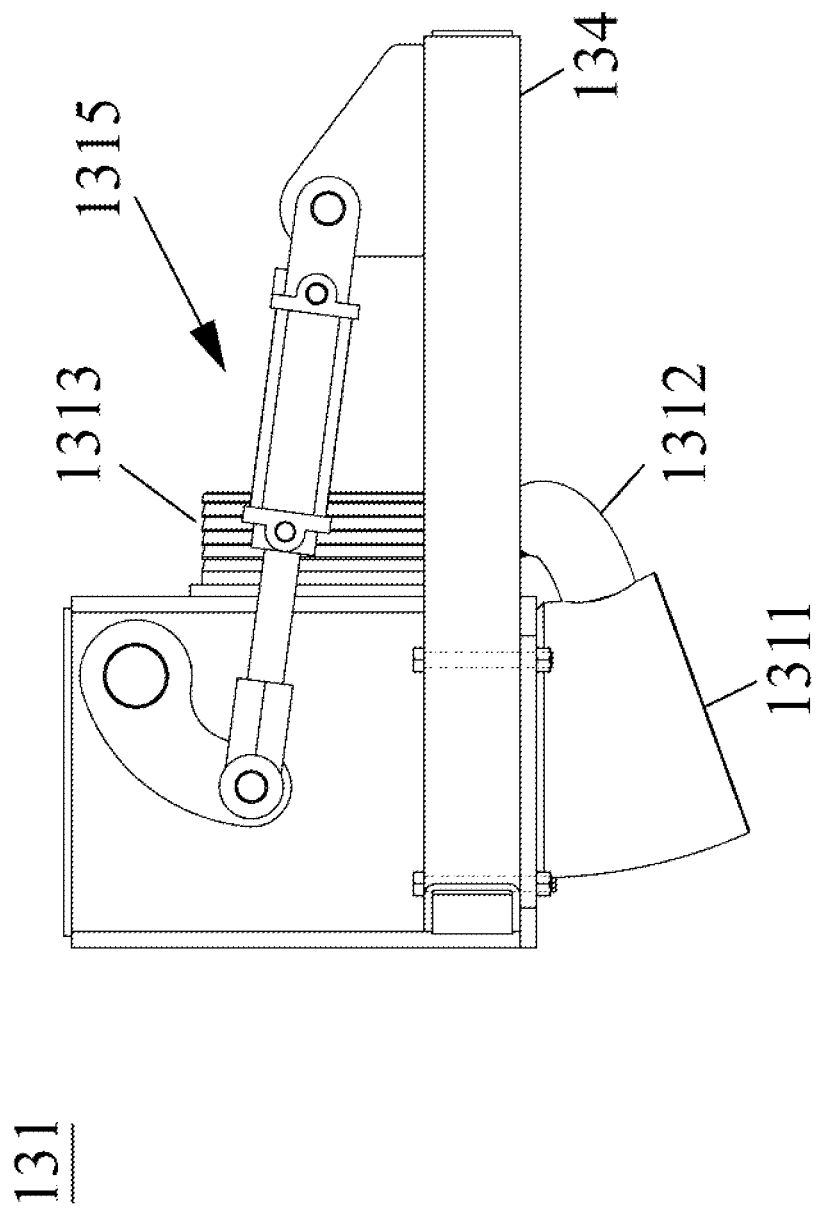
FIG. 2A illustrates a side view of a suction device of the apparatus illustrated in FIG. 1A.
Figure 2B:
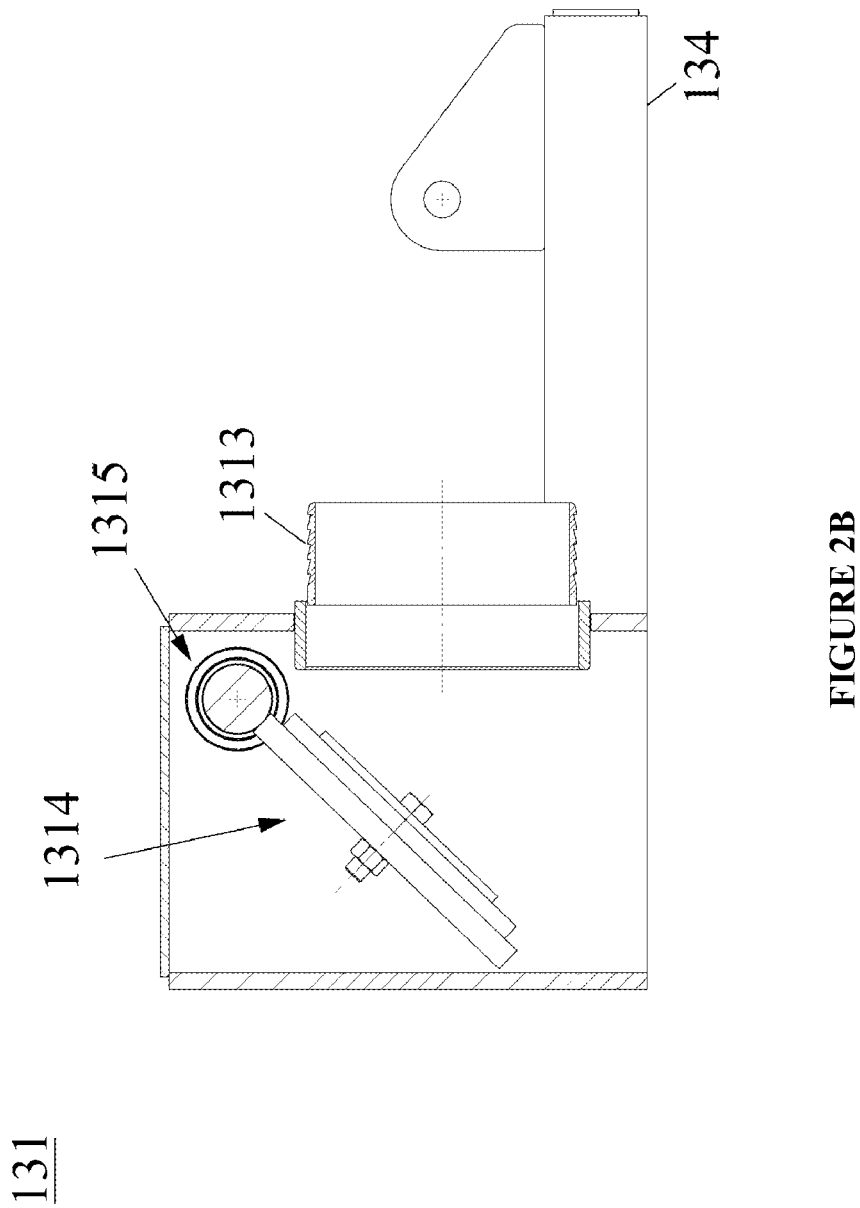
FIG. 2B illustrates a sectional view of the suction device illustrated in FIG. 2A.
Figure 2C:
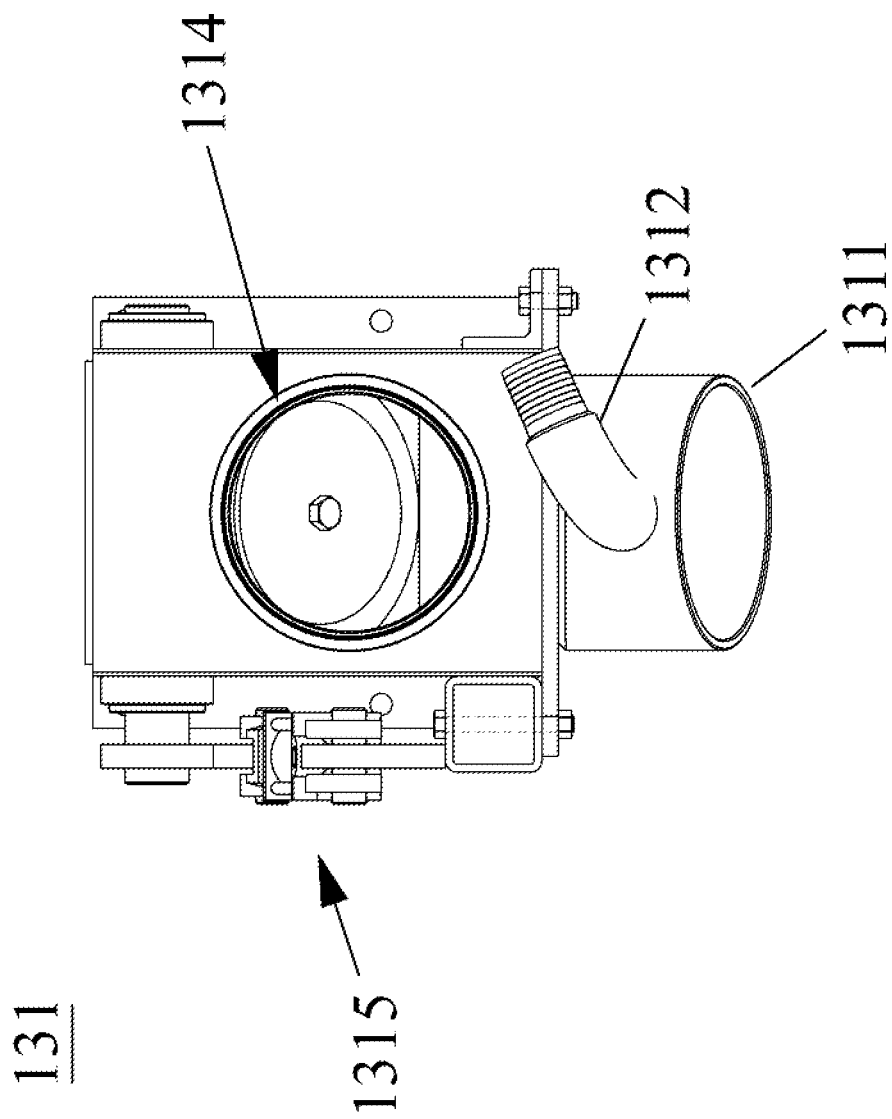
FIG. 2C illustrates a front view of the suction device illustrated in FIG. 2A.

FIG. 2A to 2C illustrate various views of the suction device 131 of the apparatus 100. FIG. 2A illustrates a side view of the suction device 131. FIG. 2B illustrates a sectional view of the suction device 131. FIG. 2C illustrates a front view of the suction device 131. Further components of the example apparatus 100 are described below with reference to general aspects of apparatus according to embodiments of the instant technology.

Chassis

The apparatus comprises a chassis for providing structural integrity to the apparatus and/or between the components of the apparatus. Depending on the embodiment, one or more portions or all of the chassis may be separate parts or integrally shaped with other components of the apparatus. For example, parts of the chassis and the holding tank may be integrally shaped.

The chassis may be configured to allow the apparatus to be pulled by a towing vehicle and/or be self-propelled. According to embodiments, the chassis is configured for operative attachment of the holding tank. Depending on the embodiment, the chassis may be configured for operative attachment of one or more further components of the apparatus including the material collector and the pumping system, for example.

The chassis includes a suitably configured frame operatively attached to one or more wheel axles and may include a breaking system. The number of wheels, wheel axles, size of the wheels, axle configuration, wheelbases, configuration of the frame as well as other aspects of the chassis and/or the apparatus may be determined based on overall size and/or weight of the apparatus and characteristics of the environment in which the apparatus is intended to be employed, and/or other design aspects.

The towing vehicle may be a farm, barn, silo, field, construction or other tractor. The apparatus can be configured to be suitable for agricultural use. The chassis is configured so the apparatus can be driven on the surface from which the material is to be collected and/or on the material itself. The apparatus may be adapted for use in an animal husbandry facility, such as a dairy barn or milking shed, which may include alleys or gutters for collection of manure.

As illustrated in FIGS. 1A, 1B and 1C, the chassis 110 of the example apparatus 100 comprises a pair of wheels 111 with a corresponding suspension, and a hitch 112 for operative attachment of the apparatus 100 to a towing vehicle (not illustrated). The chassis of the example apparatus 100 comprises various structural elements forming a frame which is operatively attached to the holding tank 120. To which portions of the material collector 130 and various other components of the apparatus are affixed via welds, rivets, screws or other forms of mechanical interconnections.

Holding Tank

The holding tank is configured for gathering material that can be picked up from a surface by the apparatus and for holding the material during transportation until it is released at another site. The holding tank may be made of steel, plastic or other suitable material or combination of materials that can provide sufficient structural integrity.

Depending on the embodiment, the holding tank may be configured as an elongate cylindrical or otherwise shaped substantially hollow body, which can be closed off at either end by suitably configured end caps. The holding tank can have circular, elliptical, prismatic or otherwise configured cross sections. Depending on the embodiment, the holding tank can have substantially equal or varying cross sections along its length. Depending on the embodiment, an end cap can be integrally formed with or a modular component of the holding tank. Different end caps can be configured differently. For example, an end cap can be welded or otherwise integrally formed with the holding tank or configured as a releaseably attachable door, which can be used for cleaning, maintenance of the holding tank or for other tasks, for example. Depending on the embodiment, an end cap may be generally outwardly or inwardly bulgingly shaped.

According to embodiments, the material-entry aperture is provided in a bottom surface of the holding tank between the front and back of the holding tank, for example proximate the front of the holding tank. According to some embodiments, the material-entry aperture is connected to a riser conduit disposed within the holding tank. According to some embodiments, the material-entry aperture is connected to and/or formed by an articulated-conduit coupling disposed external of the holding tank. For example, the articulated-conduit coupling can comprise a swivelling elbow conduit, flexible hose or pipe conduit or other articulated-conduit coupling. The articulated-conduit coupling can be articulated within a predetermined solid angle. For this purpose, the articulated-conduit coupling can be configured to allow articulation thereof about one, two or three axes within corresponding predetermined ranges. The articulated-conduit coupling is configured to facilitate operative connection with the suction device substantially independent of height adjustments of the suction device as are described herein.

The riser conduit has one opening operatively coupled to the material-entry aperture and one or more second openings disposed proximate a top of the holding tank. According to some embodiments, the riser conduit has one second opening which is directed towards the bottom of the holding tank, either substantially towards the front or the back of the holding tank. Directing the second opening into a predetermined direction can aid in mixing, filling and/or flushing the holding tank. Mixing can aid in suppressing segregation of solid material from liquid material and/or formation of material deposits within the holding tank. For example, directing the second opening into a direction substantially opposite of a material-discharge aperture of the holding tank can aid in flushing and discharging substantially all material from the holding tank.

The holding tank includes a material-discharge aperture. According to an embodiment, the material-discharge aperture is disposed proximate the rear of the holding tank. The material-discharge aperture can be operatively connected with a material-distribution system suitable for discharging collected material in a predetermined manner. For example, the material-distribution system can include a nozzle, spreader plate or sub-surface injection system. According to one embodiment, the discharge outlet is connected via a fluid conduit for transferring the manure to a separate spreading apparatus, a holding vessel or other storage or distribution system. According to an embodiment, the material-discharge aperture can be provided by a suitably operable material-discharge aperture valve. The material-discharge aperture valve can be closed to suppress leakage or opened to allow drainage. The apparatus may comprise a mechanical or otherwise actuated system that provides remote operation of the material-discharge aperture valve, for example from a towing vehicle.

According to some embodiments, the apparatus comprises a mixing device disposed inside the holding tank, for example, a propeller, Archimedes' screw or other device for stirring material within the holding tank. According to an embodiment, the mixing device is externally driven. Depending on the embodiment, the mixing device may be coupled to a drive system, for example by a motor of the towing vehicle or by a motor mounted on the apparatus itself. The mixing device may be configured for independent operation from other components of the apparatus.

As illustrated in FIGS. 1A, 1B, and 1C, the holding tank 120 of the example apparatus 100 has a generally tubular configuration with a cap at either end. The caps are welded to the tubular portion of the holding tank. The holding tank 120 includes a maintenance opening and door for providing access to the inside of the holding tank. The apparatus 100 has a material-intake aperture 127, a single-axis articulated-conduit coupling 122 comprising a substantially right angle elbow pipe configured to swivel about an axis substantially parallel with an axis of the material-intake aperture 127, a riser conduit 121, a mixing device comprising a propeller 123, and a material-distribution system comprising a nozzle, a spreader plate, and a material-discharge aperture valve 125. As described generally further below, the example apparatus 100 includes vacuum outlets 1400 attached to the holding tank 120.

Material Collector

The material collector includes a suction device and a material-moving or scraping system for moving material on the surface towards the suction device. The suction device is configured to gather material from the surface substantially via suction or vacuum. The suction device comprises a nozzle defining an inlet for taking up material from the surface. The suction device has an outlet for direct or indirect connection with the material-entry aperture of the holding tank, as further described herein.

According to some embodiments, the suction device includes a suction device shut-off valve for controlling backflow of material from the apparatus. The suction device shut-off valve can be closed in order to control the amount of material that can escape the apparatus through the inlet of the suction device when the holding tank is no longer adequately decompressed. According to an embodiment, the suction device shut-off valve is disposed proximate the inlet of the suction device. The suction device shut-off valve can aid in limiting spillage of material from the apparatus through the suction device to a predetermined amount. According to some embodiments, the suction device shut-off valve is positioned substantially adjacent the inlet of the suction device, thereby limiting the back-flow of the material from within the apparatus, for example, from between the suction device and the material-entry aperture of the holding tank. According to some embodiments of the present technology, providing an apparatus with an adequately disposed suction device shut-off valve can help limit spillage of material from the apparatus during transport, for example within a barn and/or from a barn to a field.

Depending on the embodiment, the suction device shut-off valve may be operatively combined with a corresponding valve actuator for operating the suction device shut-off valve. According to some embodiments, the apparatus comprises a mechanically, pneumatically and/or hydraulically or otherwise suction device shut-off valve actuator system that provides manual and/or remote operation of the suction device shut-off valve, for example from the apparatus and/or a towing vehicle.

According to embodiments, the inlet of the suction device is defined by the nozzle. Depending on the embodiment, the inlet can be a planar or non-planer opening. Depending on the embodiment, the suction device may be configured to allow for changing the inclination of an axis of the nozzle relative to the surface from which material can be collected, in order to facilitate different material-uptake operating conditions. According to an embodiment, the inlet is aligned generally oblique with respect to the surface during material uptake. Depending on the embodiment, the nozzle may be configured with a generally forward facing inlet which can facilitate material collection from the surface, wherein forward facing refers to a typical driving direction. A forward facing inlet can further facilitate air intake through the nozzle, which in turn can improve material uptake, as described herein.

Depending on the embodiment, the inlet and/or the suction device as well as the material-moving system may or may not be height adjustable such that their distance relative to the surface from which the material is to be collected may be varied. Depending on the embodiment, the inlet and/or the suction device may be independently height adjustable of the material-moving system, which can be used to adjust material collection by the suction device in response to the quantity and/or rate of material being collected. This configuration can permit the material-moving system to remain positioned adjacent or substantially in contact with the floor surface while allowing the inlet of the suction device to be adjusted relative in height thereto in response to varying quantities of material being collected and/or variations of the surface underneath the apparatus during movement of thereof. Depending on the embodiment, hydraulically, pneumatically or mechanically controlled mechanisms or other mechanisms may be employed to adjust the height of the inlet of the suction device and/or the material-moving system.

According to embodiments, the inlet of the suction device is connected to the material-entry aperture. According to an embodiment, the suction device and the material-entry aperture are flexibly connected, for example by a hose, tube or other flexible conduit that facilitates height adjustment of the suction device relative to the material-entry aperture of the holding tank. Reducing the distance between the inlet of the suction device and the surface that the material can be collected from can increase material pick-up rate. This can help reduce the amount of material left behind on the surface and/or in the material-moving system, the suction device and/or other parts of the apparatus through which material moves into the holding tank. Depending on the distance from the inlet of the suction device to the surface and the amount of material disposed on the surface, the speed at which the apparatus moves may need to be adjusted to facilitate effective material collection.

According to an embodiment, a snorkel may be provided alongside the inlet of the suction device for introducing predetermined quantities of air into the material flow during collection. For example, the snorkel may be formed as a part of a nozzle of the suction device. Air taken up via the snorkel and entrained with the material, can make it easier to lift material from the surface and pneumatically convey material from the surface. The quantity of air taken up via the snorkel that can facilitate material collection can depend on for example, the viscosity of the material, amount of material and/or the material uptake rate among other factors. Depending on the embodiment, the snorkel may include an air-flow control valve.

In some embodiments, the air-flow control valve can be used to set if and/or when air is provided and/or the quantity of air that is provided to the suction device. This can aid in adjusting operation of the apparatus for the consistency of the material being collected and to adjust for varying material uptake rates. According to an embodiment, the air-flow control valve is configured to open only if a pressure difference between the outside of the snorkel and the inside of the suction device exceeds a predetermined value. This may occur, for example when the inlet of the suction device is entirely submersed in material. For this purpose and depending on the embodiment, the air-flow control valve can be configured in one and/or more ways. For example, according to some embodiments, the air-flow control valve can be self opening, for example it can be resiliently/spring biased so that it opens when a predetermined pressure differential is exceeded. According some embodiments, the air-flow control valve can be manually, pneumatically, hydraulically, electrically and/or otherwise actuated. According to some embodiments, the air-flow control valve can be remotely operated, for example by a driver of the apparatus or from a towing vehicle.

The material-moving system is configured for directing the material toward the inlet of the suction device and may include, for example a brush, rotating brush, scraper, squeegee, air blast, water jet, or a combination thereof. The material-moving system may comprise one or more scraping elements, which may be made from a rigid yet flexible material, for example a durable reinforced rubber or other suitable compound. The material-moving system may be height adjustable and may be self-levelling and/or configured to allow manual levelling with respect to the surface from which material can be collected. According to some embodiments, the material-moving system includes a mechanical, hydraulic, pneumatic and/or otherwise configured suspension system for automatic self-levelling under predetermined operating conditions. The suspension system is configured to allow maintaining predetermined distances between the material-moving system and the surface from which material is to be picked up during operation of the apparatus. The suspension system may be configured for adequate operation within a predetermined range of speeds of the apparatus during material collection, material uptake rates and/or other aspects of the apparatus or its operational conditions.

According to an embodiment, the inlet of the suction device may be configured through a distribution means to permit collection across the width of the material-moving system or collection may occur at a discrete point or points. The material-moving system may have a shape adapted for funnelling and/or ploughing the material toward the inlet of the suction device. For example, the material-moving system may include V-shaped scrapers with the apex of the V formed by the scrapers disposed proximate the suction device. The material-moving system may be disposed proximate the front or end of the apparatus or between the front and end of the apparatus to control compaction of the material on the surface. Depending on the embodiment, the position(s) of the material-moving system and/or the suction device may be adjustable, for example, with respect to their distances from the material-entry aperture along an axis of the apparatus that is generally parallel to the intended driving direction of the apparatus.

According to an embodiment, the material-moving system can be adjusted to allow control of the width of material collection in driving direction. For this purpose the material-moving system can include a variable-width mechanism. The variable-width mechanism can be useful in the collection of manure from alleys or gutters, as it allows the material-moving system to fit the width of the alley or gutter and can reduce the likelihood of manure escaping from the sides of the material-moving system. The material-moving system may include wings that are pivotally attached to each side of the material-moving system and able to pivot about vertical pivot axes. The wings may be biased outwardly towards or against the sidewalls of the alley or gutter and may resiliently adapt to changes in the width of the gutter by pivoting about the vertical pivot axis. According to an embodiment, wheels and/or rollers may be employed for resiliently abutting walls, gutters, curbs or other guides provided by the environment of the apparatus in order to guide the wings, suppress wear/tear, and/or prohibit the wings from getting caught.

According to an embodiment, the wings are configured to move about one or more vertical or other pivot axes in response to a change in the distance between the side-wall of the alley and the material-moving system. The wings may be spring biased or hydraulically or pneumatically adjustable, for example via a pneumatic or hydraulic fluid displacement cylinder, a captive gas shock absorber, or a combination thereof. The material-moving system may be configured to automatically adjust the extension of the wings to cover the width of the alley or gutter or may be manually adjusted by an operator of the apparatus. Depending on the embodiment, the adjustment may be conducted using controls within the towing vehicle. The wings may include skid plates or wear strips to reduce the likelihood of damaging the wings due to operator driving error.

As illustrated in FIGS. 1A, 1B, and 1C, the example apparatus 100 comprises a material collector 130 comprising a suction device 131, a material-moving system 133. The material collector 130 is disposed below the holding tank 120 substantially forward of the wheels 111 in driving direction. The material-moving system 133 comprises a rubber scraper affixed to a steel plough. In this specific example, the suction device 131 is affixed to the material-moving system via screws.

As illustrated in FIGS. 1A, 1B, and 1C and in greater detail in FIGS. 2A, 2B and 2C, the suction device 131 of the example apparatus 100, comprises a nozzle 1311, a snorkel 1312, an outlet 1313, and a suction device shut-off valve 1314 operable via a hydraulic-valve actuator 1315. The suction device 131 has a housing including a frame 134 for attaching the hydraulic-valve actuator 1315. The apparatus 100 includes a hydraulic control system (not illustrated) that permits remote control of the hydraulic-valve actuator 1315 from a towing vehicle. The outlet 1313 can be connected to the material-intake aperture 127 via (not illustrated) a pipe, hose, or other suitable conduit.

Pumping System

The pumping system is configured to permit compressing or decompressing the holding tank in order to provide predetermined vacuum or compressed air conditions inside the holding tank and thereby facilitate the intake or discharge of material into or out of the holding tank. The pumping system comprises one or more pumps and/or compressors, one or more material traps, a number of conduits, pipes, hoses, valves and/or other parts for operative interconnection of the components of the apparatus. Depending on the embodiment, pumps and/or compressors of the pumping system may be powered via a suitable drive system, for example by a power-take off (PTO) of a motor of the towing vehicle or by a motor mounted on or being part of the apparatus itself.

According to embodiments, the pumping system can be further configured to suppress entry of material during material collection and/or during material discharge into certain parts of the pumping system, such as certain valves, pumps and/or compressors, as obstruction of various moving components thereof can cause increased wear and/or damage. Depending on the embodiment, the pumping system may comprise suitably configured vacuum outlets, one or more primary material traps and/or one or more secondary material traps, which may be interconnected in series and/or partially parallel to control the amount of material entering into certain parts of the pumping system. Primary, secondary or other material traps may also be referred to as safety screens. According to embodiments, the pumping system can comprise filter, condensation and/or water trap systems to control wear and tear of the pumping system and other components of the apparatus, and to provide predetermined safety standards during material intake and/or discharge. For example, primary, secondary or other material traps can comprise filters or filter systems.

According to an embodiment, the holding tank includes one or more vacuum outlets at or proximate the top of the holding tank. By employing two or more vacuum outlets, the velocity through each outlet can be decreased in order to reduce the likelihood that collected material can become entrained in the air flowing through the outlets. Depending on the embodiment, different vacuum outlets may have substantially equal or different configurations, for example, they may be of the same size or different sizes. The vacuum outlets may be configured in order to preferentially distribute collected material to different parts of the tank.

Depending on the embodiment, each vacuum outlet may include or be coupled with a primary material trap to further reduce the likelihood of material escaping through the vacuum outlet. Primary material traps can be configured to suppress escape of material particularly as the holding tank gets full. Depending on the embodiment, primary material traps may be configured to allow cleaning by providing a predetermined air flow. Depending on the embodiment, a primary, secondary or other material trap may comprise a chamber configured to employ an inertia and/or centrifugal material-separating system, for example a cyclone.

According to an embodiment, the pumping system further comprises one or more secondary material traps. Air exiting the one or more primary material traps may be directed to one or more secondary material traps for yet further reducing the likelihood that entrained debris enters certain downstream components of the pumping system. Depending on the embodiment, each secondary material trap can be connected to one or more primary material traps.

According to an embodiment, the secondary material trap comprises a chamber containing a series of baffles that are arranged to create a serpentine path and/or a plurality of perforated impingement plates stacked with the perforations in an offset relationship. The secondary material trap may be similar to a knock-out pot in that it may be designed for the removal of liquid from the air flow, particularly liquid droplets. The secondary material trap may be configured to be cleaned by reversing the direction of air flow through the material trap and may be additionally or alternatively cleaned using a supplemental stream of air or water to flush out the contents of the material trap. The secondary material trap may include a drain, which may be directed back into the holding tank or elsewhere. The pumping system can be configured so that during operation air exiting the outlet of the secondary material trap substantially includes less than a predetermined amount of collected material.

Depending on the embodiment, the one or more pumps may be powered by a separate motor to independently power the one or more pumps, via interconnection with the drive train of the towing vehicle or otherwise. For example, the apparatus may be configured for operation with a towing vehicle, which may be connected to the one or more pumps using a power take-off (PTO) mechanism. The one or more pumps may comprise a valve that permits switching air flow to and from the holding tank in order to switch from depressurizing the holding tank to pressurizing the holding tank. For this purpose and according to an embodiment, the one or more pumps may comprise an intake and an exhaust port which are suitably connected to the holding tank. According to an embodiment, the one or more pumps are configured to permit reversing airflow within the intake port and the exhaust port. The pump may be a positive displacement pump, such as a rotary vane pump.

The pumping system 140 of the example apparatus 100 comprises two pumps 141, a PTO 142 for driving the pumps 141, a primary material trap 143, secondary material traps 1460 and 1480 and an oil extractor 1419. The pumps 141 are operatively connected to secondary material traps 1460 and 1480, which in turn are coupled to the primary material trap 143. The primary material trap 143 is connected to the vacuum outlets 1400 of the holding tank 120. The PTO can be coupled to a towing vehicle (not illustrated) for receiving power via a mechanical drive shaft (not illustrated). The oil extractor 1419 is coupled (not illustrated) with the pumps 141 and configured for reclaiming oil escaping from the pumping system. Oil escaping from the pumping system may include lubricants used for lubricating the pumps 141, for example.

Interconnections between vacuum outlets 1400, the couplings 1431, 1432, 1433 and 1434 of the primary material trap 143 and the secondary material traps 1460 and 1480, as well the couplings 1411 and 1412 of the pumps 141, can be established via adequate pressure/depression resilient conduits, for example steel-reinforced tubing. For example, coupling 1411 of the two pumps 141 is connected to coupling 1462 of the secondary material trap 1460. Coupling 1461 of the secondary material trap 1460 is connected to coupling 1431 of the primary material trap 143. Similarly, coupling 1412 of the two pumps 141 is connected to coupling 1482 of the secondary material trap 1480. Coupling 1481 of the secondary material trap 1480 is connected to coupling 1432 of the primary material trap 143. Each of the couplings 1433 and 1434 of the primary material trap is connected to one of the two vacuum outlets 1400 of the holding tank 120. Pressure/depression resilient conduits are schematically illustrated as thick dashed lines in FIG. 1C.

It is obvious that the foregoing embodiments of the invention are examples and can be varied in many ways. Such present or future variations are not to be regarded as a departure from the scope of the invention, and all such modifications as would be obvious to one skilled in the art are intended to be included within the scope of the following claims.

I claim:
1. An apparatus for collecting material from a surface, the apparatus comprising:
 a) a chassis comprising wheels for relocating the apparatus on the surface;
 b) a holding tank for receiving the material, the holding tank operatively coupled with the chassis, the holding tank having a material-entry aperture in the holding tank;
 c) a material collector comprising a suction device, the suction device operatively coupled with the material-entry aperture, the suction device having an inlet for disposition adjacent the surface, the material collector further comprises a suction device shut-off valve positioned proximate to the inlet of the suction device, the suction device shut-off valve configured to assume a closed configuration and one or more open positions, wherein in the closed position the suction device shut-off valve is configured to substantially suppress backflow of material from the inlet of the suction device; and
 d) a pumping system operatively connected with the holding tank for depressurising the holding tank and thereby gathering the material at least partially via suction through the inlet of the suction device and the material-entry aperture in the holding tank.

2. The apparatus according to claim 1, wherein the material-entry aperture is disposed proximate a bottom front surface of the holding tank.

3. The apparatus according to claim 1, further configured as a trailer for operative attachment to a pulling vehicle.

4. The apparatus according to claim 1, wherein the material collector further comprises a material-moving system, the material moving system configured for operative disposition adjacent the surface, the material-moving system for moving the material on the surface towards the inlet of the suction device when the apparatus moves in a forward direction.

5. The apparatus according to claim 4, wherein the material-moving system comprises one or more scrapers, brushes, ploughs, air blowers and/or water jets.

6. The apparatus according to claim 1, wherein the shut-off valve is configured for remote operation.

7. The apparatus according to claim 6, wherein the shut-off valve is operable via a hydraulic-valve actuator.

8. The apparatus according to claim 1, further comprising a second conduit disposed within the holding tank, the second conduit having one opening operatively coupled to the material-entry aperture and a second opening disposed proximate a top of the holding tank.

9. The apparatus according to claim 8, wherein the second opening is directed towards the bottom of the holding tank.

10. The apparatus according to claim 8, wherein the second opening is directed towards the rear of the holding tank.

* * * * *